(12) United States Patent
Murakami et al.

(10) Patent No.: US 8,058,819 B2
(45) Date of Patent: Nov. 15, 2011

(54) ILLUMINATION SYSTEM

(75) Inventors: Tadashi Murakami, Kadoma (JP);
Tamami Sobagaki, Kadoma (JP);
Shigeo Gotou, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 190 days.

(21) Appl. No.: 12/461,788

(22) Filed: Aug. 25, 2009

(65) Prior Publication Data

US 2010/0052571 A1 Mar. 4, 2010

(30) Foreign Application Priority Data

Aug. 26, 2008 (JP) ................. 2008-216298

(51) Int. Cl.
*G05F 1/00* (2006.01)
*H05B 37/03* (2006.01)
(52) U.S. Cl. ..................... 315/297; 315/152
(58) Field of Classification Search ............. 315/297, 315/152
See application file for complete search history.

(56) References Cited

U.S. PATENT DOCUMENTS 4,400,700 A * 8/1983 Rittenbach .............. 342/100

FOREIGN PATENT DOCUMENTS

| EP | 1 408 276 | 4/2004 |
| EP | 1408276 A2 * | 4/2004 |
| GB | 2 444 734 | 6/2008 |
| GB | 2 455 504 | 6/2009 |
| WO | 03/098977 | 11/2003 |

OTHER PUBLICATIONS

Kluth Manfred; Illumination system using detectors, Apr. 14, 2004, EP1408276 Abstract English Translation.*

* cited by examiner

*Primary Examiner* — Shawki S Ismail
*Assistant Examiner* — Thienvu Tran
(74) *Attorney, Agent, or Firm* — Bacon & Thomas, PLLC

(57) ABSTRACT

An illumination system includes a plurality of illumination devices and a number of sensor blocks. In each of the sensor blocks, an active sensor is provided to detect a moving object traveling within a detection area thereof and plural amplifier circuits is provided to divide a detection signal transmitted from the active sensor into plural frequency bands and for amplifying signal components of the frequency bands. Provided in a one-to-one relationship with the amplifier circuits is plural judgment units that, based on the amplified signal components of the frequency bands provided from the amplifier circuits, judges whether the moving object is travelling at a travel velocity corresponding to any one of the frequency bands. A control unit is also provided to perform a turn-on control on at least one of the illumination devices based on judgment results made by the judgment units.

4 Claims, 9 Drawing Sheets

ILLUMINATION SYSTEM

FIELD OF THE INVENTION

The present invention relates to an illumination system for turning on an illumination device by detecting a moving object with an active sensor.

BACKGROUND OF THE INVENTION

Conventionally, there is known an illumination system that turns on an illumination device by detecting the presence of a human body with a human detection sensor. A passive infrared radiation (PIR) sensor is generally used as the human detection sensor. The PIR sensor is of a passive type that detects the presence of a human body by sensing a change in the amount of received infrared ray caused by the movement of the human body within a detection area of the sensor.

However, a very small amount of the infrared rays is emitted from a human body. Therefore, if a human detection sensor is provided at the ceiling of a room for instance, the distance between the human detection sensor and the human body to be detected becomes too long. This results in reduced sensing accuracy.

Taking this into account, it may be thinkable to use, as the human detection sensor, an active sensor capable of highly accurately sensing a detection object even when the detection object is distant from the sensor. The active sensor is designed to, e.g., emit a wave toward the detection object and receive the reflected wave from the detection object. If the detection object is in motion, the frequency of the reflected wave makes change with respect to the transmitted wave by the Doppler effect. The active sensor detects the presence of the moving detection object (hereinafter referred to as a moving object) by detecting the frequency change. Using this detection principle, it is possible to detect a motor vehicle as well as a human body.

The amount of change in the observed frequency, i.e., the Doppler frequency $f_d$, may be expressed by Eq. (1)

$$f_d = \frac{2f_0}{c} \cdot V, \qquad \text{Eq. (1)}$$

where $f_0$ is the frequency of the emitted wave; V is the velocity of the moving object; and c is the speed of light. As can be seen in this equation, the Doppler frequency $f_d$ varies depending on the velocity V of the moving object.

There is known a moving object detection device that makes use of the above-noted characteristics to determine whether a moving object is a human being or not (see, e.g., Japanese Patent Laid-open Application No. 2007-127461). With this moving object detection device, the Doppler waveform extracted from the wave received by an active sensor is Fourier-transformed to eventually generate a spectrum waveform. If there exist two peak frequencies in the spectrum waveform, it is determined that they are attributable to the movement of the hands and the feet moving at different velocities, thus making a judgment that the moving object is a human being. In contrast, if there exists a single peak frequency, it is determined that a motor vehicle is moving at a constant speed, thus making a judgment that the moving object is a motor vehicle. The kind of the moving object is judged in this manner.

With the moving object detection device mentioned above, however, it is impossible to detect the velocity of the moving object. In an illumination system, there is a need to detect the travel velocity of a moving object with an active sensor and to perform illumination control according to the travel velocity thus detected. Since, however, the travel velocity of a moving object cannot be detected even when employing the configuration of the aforementioned moving object detection device, it is difficult to perform illumination control according to the travel velocity.

SUMMARY OF THE INVENTION

In view of the above, the present invention provides an illumination system capable of detecting the travel velocity of a moving object with an active sensor and performing illumination control based on the travel velocity thus detected.

In accordance with an embodiment of the present invention, there is provided an illumination system including: a plurality of illumination devices and a number of sensor blocks.

Each of the sensor blocks includes: an active sensor for detecting a moving object traveling within a detection area thereof; plural amplifier circuits for dividing a detection signal transmitted from the active sensor into plural frequency bands and for amplifying signal components of the frequency bands; plural judgment units provided in a one-to-one relationship with the amplifier circuits for, based on the amplified signal components of the frequency bands provided from the amplifier circuits, judging whether the moving object is travelling at a travel velocity corresponding to any one of the frequency bands; and a control unit for performing a turn-on control on at least one of the illumination devices based on judgment results made by the judgment units.

In this configuration, the detection signal transmitted from the active sensor is divided into the plural frequency bands. The presence of the moving object travelling at the travel velocity corresponding to the respective frequency bands is judged based on the signal components of the respective frequency bands. Therefore, it is possible to detect the travel velocity of the moving object. This makes it possible to perform turn-on control of the illumination device based on the travel velocity of the moving object.

The control unit may determine whether the travel velocity of the moving object is low or high based on the judgment results made by the judgment units and turns on one or more illumination devices arranged within the detection area of the active sensor if the travel velocity of the moving object is low and turns on illumination devices arranged within and around the detection area if the travel velocity of the moving object is high.

In this configuration, only the illumination devices arranged within the detection area of the active sensor are turned on if the travel velocity of the moving object is low. This assists in saving energy. In case where the travel velocity of the moving object is high, it is possible to illuminate the surrounding area around of the detection area from which the moving object is detected before the moving object passes through the detection area and reaches the surrounding area. Therefore, the moving object travelling at a high travel velocity can be illuminated with no interruption of illumination regardless of its position.

The control unit may determine the travel velocity of the moving object based on the judgment results made by the judgment units and adjusts a turn-on duration of said at least one of the illumination devices based on travel velocity thus determined.

In this configuration, the turn-on duration of the illumination devices is adjusted depending on the travel velocity of the moving object. This makes it possible to control the turn-on duration in harmony with the time for the moving object to pass through the illuminated area, which assists in saving energy.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Illumination systems in accordance with embodiments of the present invention will now be described with reference to the accompanying drawings which form a part hereof.

First Embodiment

Figure 1:
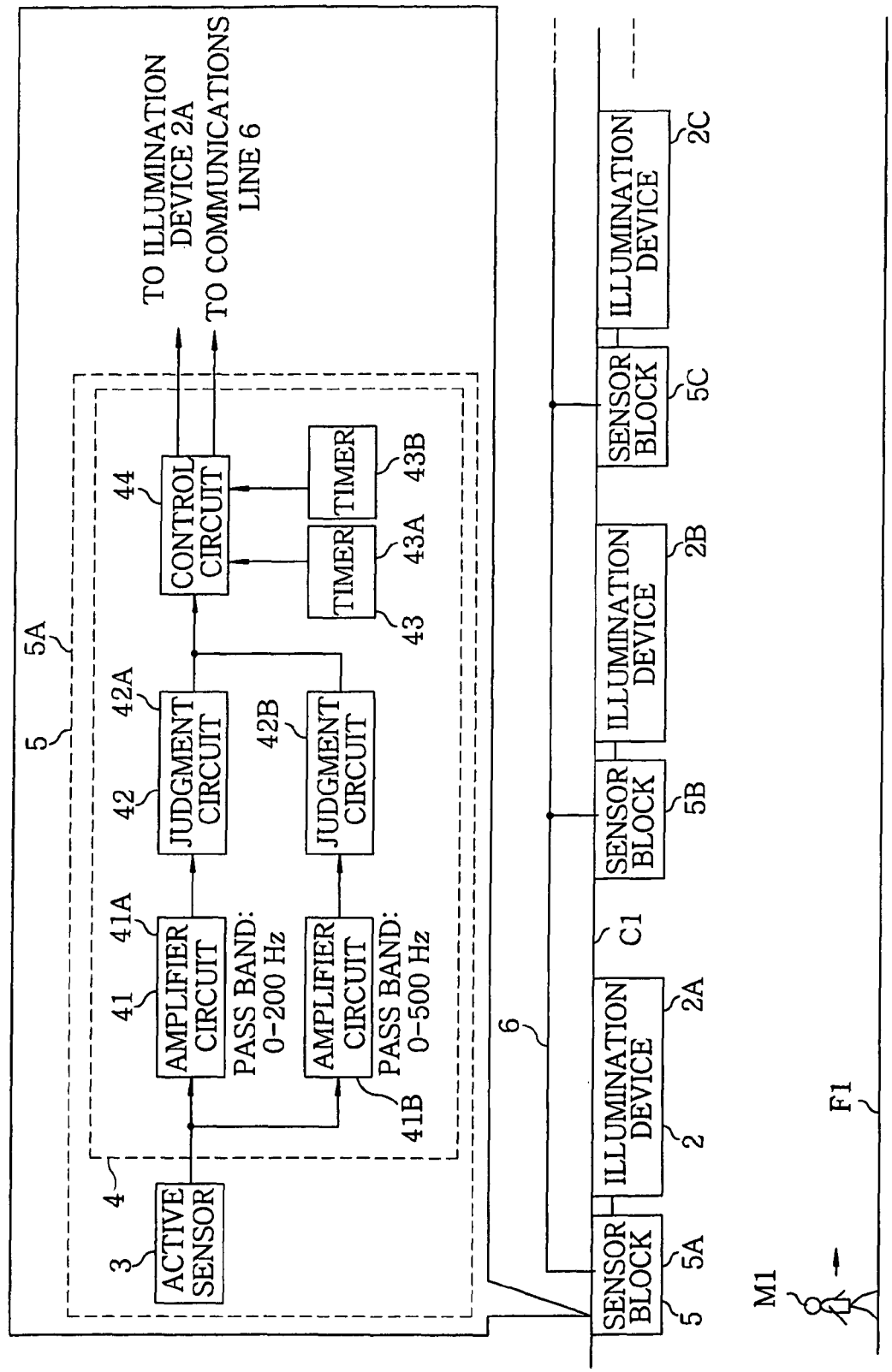
FIG. 1 is a schematic diagram showing an illumination system in accordance with a first embodiment of the present invention.

FIG. 1 shows the configuration of an illumination system in accordance with a first embodiment of the present invention. The illumination system 1 of the present embodiment includes illumination devices 2 (e.g., 2A, 2B and 2C) fixed to a ceiling C1. The illumination system 1 further includes sensor blocks 5 (e.g., 5A, 5B and 5C), each of which includes an active sensor 3 for detecting a moving object M1 travelling along a floor surface F1 near the illumination devices 2 and a control device (or a control unit) 4 responsive to a detection signal transmitted from the sensor 3 for controllably turning on a corresponding illumination device 2. The sensor blocks 5 are provided near the respective illumination devices 2 in a one-to-one corresponding relationship and are arranged in the vicinity of the ceiling C1. The sensor blocks 5 are connected to each other by a communications line 6.

The sensor 3, which is formed of a Doppler sensor, emits a wave such as a milliwave or the like and receives reflected wave from the moving object M1, the reflected waves being subjected to frequency shift or change under the Doppler effect. The sensor 3 detects the presence of the moving object M1 by detecting the frequency change. The amount of frequency change, i.e., the Doppler frequency, varies with the travel velocity of the moving object M1. Therefore, the signal transmitted by the sensor 3 contains a signal component indicative of the travel velocity of the moving object M1. The control device 4 detects the travel velocity of the moving object M1 based on the detected signal. Depending on the results of detection, the control device 4 selects one or more illumination devices 2 to be turned on and controls the area to be illuminated.

The moving object M1 includes a motor vehicle as well as the human being illustrated in FIG. 1. The numbers of the illumination devices and the sensors are not limited.

The control device 4 includes two filtered amplifier circuits 41 (i.e., 41A and 41B) that divides the signal transmitted from the sensor 3 into two frequency bands and amplifying signal components of the respective frequency bands, and two judgment circuits 42 (i.e., 42A and 42B) responsive to the signal components of the respective frequency bands amplified by the amplifier circuits 41 for judging the presence of the moving object M1 travelling at the travel velocity corresponding to the respective frequency bands.

Each amplifier circuit 41 includes a filter unit and an amplifier unit. The amplifier circuits 41 and the judgment circuits 42 are provided in a one-to-one corresponding relationship and each judgment circuit 42 serves as a judgment unit.

The control device 4 further includes timers 43 (i.e., 43A and 43B) for counting the turn-on duration of the illumination device 2 based on the judgment results of the judgment circuits 42, and a control circuit 44 for turning on one or more illumination devices 2 based on the judgment results of the judgment circuits 42 and the results of time count of the timers 43.

By adjusting circuit parameters of each amplifier circuit 41, the frequency band thereof can be set to amplify the signal components therein. This setting enables the amplifier circuits 41 to operate as filters, e.g., low-pass filters. The cutoff frequency of the filters is preset and the pass bands of the amplifier circuits 41A and 41B are about 0 to 200 Hz and about 0 to 500 Hz, respectively. These pass bands are set under the assumption that the detection objects of the sensor 3 are a human being and a motor vehicle such as a forklift truck or the like. The values of the pass bands correspond to the Doppler frequencies which depend on the travel velocities of the human being and the motor vehicle.

The judgment circuits 42A and 42B respectively detect the signal-to-noise (S/N) ratios of the signals amplified by the amplifier circuits 41 and judge whether the S/N ratios exceed a predetermined threshold. Through this judgment, the presence of the moving object M1, whose Doppler frequency falls within the pass bands of the amplifier circuits 41A and 41B, is judged. The output value of each of the judgment circuits 42 is high if the S/N ratio of the signal inputted thereto is equal to or greater than the threshold. If otherwise, the output value of each of the judgment circuits 42 is low. The threshold is set to, e.g., about 3.5 dB.

The control circuit 44 determines the travel velocity of the moving object M1 based on the judgment results of the judgment circuits 42 and selectively turns on and off the illumination devices 2 according to the results thus determined. One example of the relationship between the criteria of such determination and the resultant turn-on control carried out by each control circuit 44 is shown in Table 1.

TABLE 1

| Output Value of Judgment Circuit 42A | Output Value of Judgment Circuit 42B | Detection Result and Travel Velocity of Object | Turn-on Control |
| --- | --- | --- | --- |
| low | low | not detected | illumination device in its detection area is turned off |
| high | low | detected slow | illumination devices in its detection area is turned on |
| low | high | detected fast | Illumination devices in and around its detection area are turned on |
| high | high | detected fast | Same as above |

Hereinafter, the velocity determined as being fast or slow based on the determination criteria shown in Table 1 will be merely referred to as "high" or "low".

Figure 2:
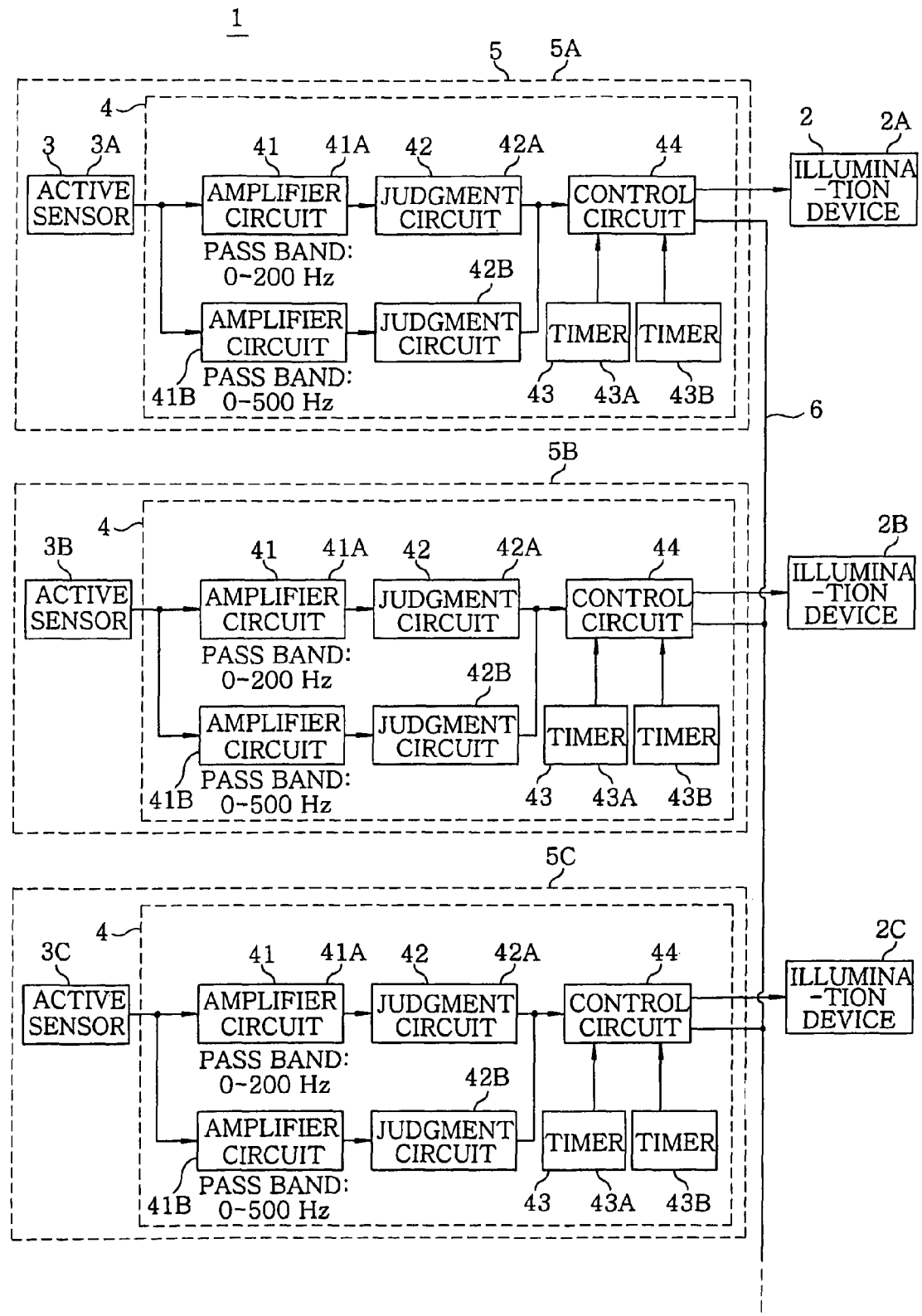
FIG. 2 is an electric block diagram showing the illumination system.

FIG. 2 shows the electrical configuration of the illumination system 1. The control circuits 44 of the sensor blocks 5A to 5C controllably turn on the illumination devices 2A to 2C, respectively. Hereinafter, the sensors 3 of the sensor blocks 5A to 5C will be respectively designated by reference characters 3A, 3B and 3C. If a sensor 3 of one of sensor blocks 5 has detected the moving object M1 in its detection area, and it is required to turn on the illumination device 2 for its neighboring detection area, the control circuit 44 of that sensor block 5 transmits, through the communications line 6, a turn-on command signal to the control circuit 44 of the sensor block 5 for the neighboring detection area to turn on the illumination device 2 for the neighboring detection area.

Figure 3:
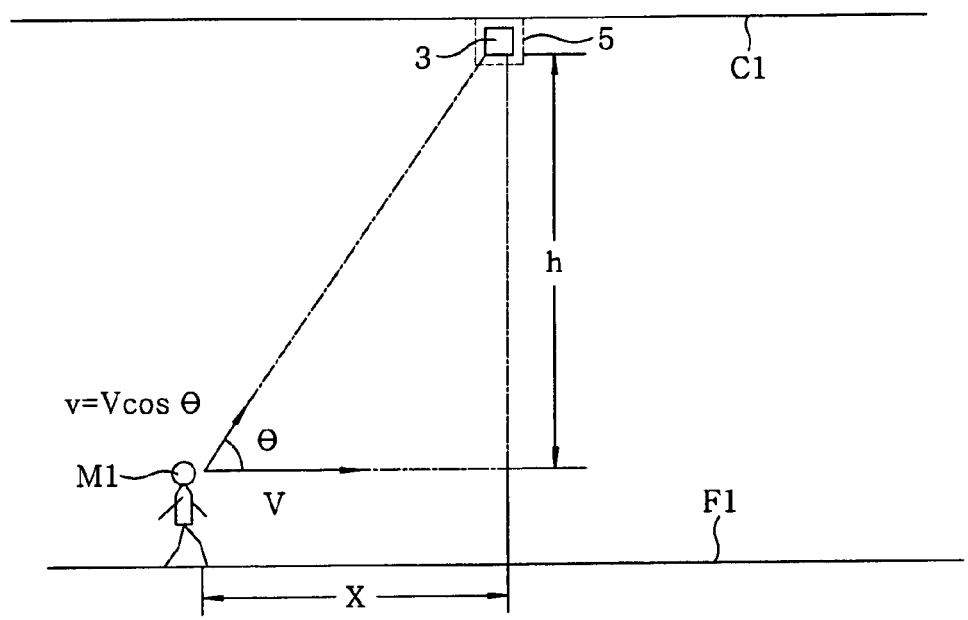
FIG. 3 shows a method for calculating the Doppler frequency of a moving object in the illumination system.

Next, a method of determining the pass bands of each amplifier circuit 41 will be described with reference to FIG. 3. As illustrated in FIG. 3, the sensor 3 is installed at the high ceiling C1 of a warehouse or the like, and the moving object M1 travels along the floor surface F1. The Doppler frequency $f_d$, may be expressed by Eq. (2):

$$f_d = \frac{2f_0}{c} v = \frac{2f_0}{c} \cdot V \cos\theta, \quad \text{Eq. (2)}$$

where $f_0$ is the frequency of the wave emitted by the sensor 3; c is the speed of light; V is the velocity of the moving object M1 traveling along the floor surface F1; v is the velocity component of the moving object M1 in the direction toward the sensor 3; and θ is the angle between the line passing through the moving object M1 and the sensor 3 and the travel direction of the moving object M1.

cos θ can be expressed by Eq. (3):

$$\cos\theta = \frac{x}{\sqrt{x^2 + h^2}} \quad \text{Eq. (3)}$$

where h is the vertical distance between the moving object M1 and the sensor 3, and x is the horizontal distance therebetween.

Substituting Eq. (3) into Eq. (2), Eq. (4) is obtained as follows:

$$f_d = \frac{2f_0}{c} \cdot V \cdot \frac{x}{\sqrt{x^2 + h^2}} \quad \text{Eq. (4)}$$

Figure 4:
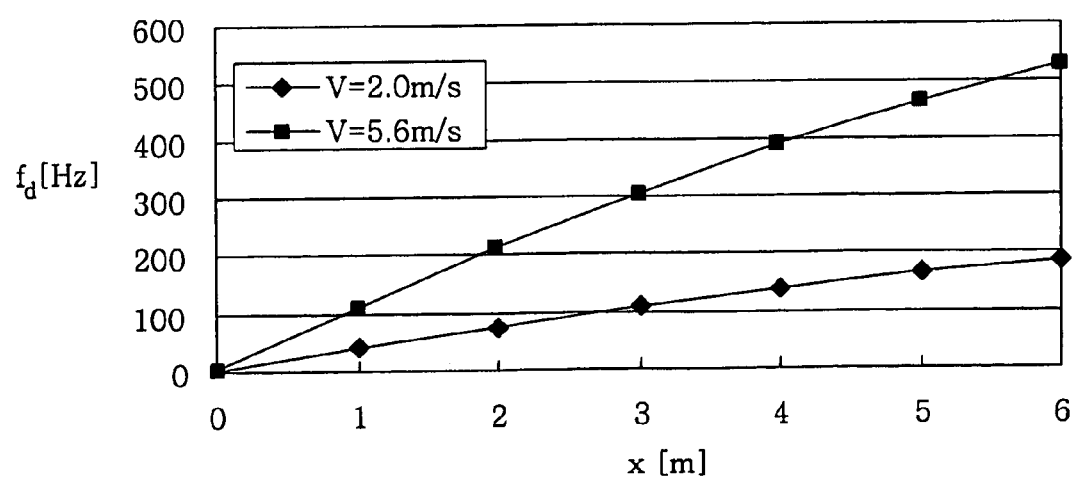
FIG. 4 shows a graph representing the relationship between the position of the moving object relative to an active sensor in the illumination system and the Doppler frequency.

FIG. 4 shows the changes in the Doppler frequency $f_d$ when $f_0$ is 24.1 GHz, c is 3×10$^8$ m/s, h is 10 m, and V is 2.0 m/s and 5.6 m/s, in Eq. (4). As can be seen in FIG. 4, the Doppler frequency $f_d$ is zero, when the x=zero, and increases as the x becomes greater. In addition, the Doppler frequency $f_d$ varies with the travel velocity V and gets greater as the travel velocity V becomes higher. The travel velocity of 2.0 m/s is the value corresponding to the supposed maximum velocity of a human being, while the travel velocity of 5.6 m/s (approximately 20 km/h) is the value corresponding to the supposed maximum velocity of a motor vehicle such as a forklift truck or the like.

The detection area of each sensor 3 on the floor surface F1 is set as, e.g., a generally circular area of about 10 m in diameter. In this setting, the value of x corresponding to the detection area thus set ranges from 0 to 5 m. In FIG. 4, when x is 5 and V are 2.0 and 5.6, the Doppler frequency $f_d$ is 165 Hz and 465 Hz, respectively. Taking this into account, the frequency bands of the amplifier circuits 41A and 41B for the signal components extracted from the detection signal of the sensor 3 are decided to be about 0 to 200 Hz and about 0 to 500 Hz, respectively. This means that the object mainly to be detected by the amplifier circuit 41A and the judgment circuit 42A is a human being, while the object mainly to be detected by the amplifier circuit 41B and the judgment circuit 42B is a motor vehicle.

Figure 5A:
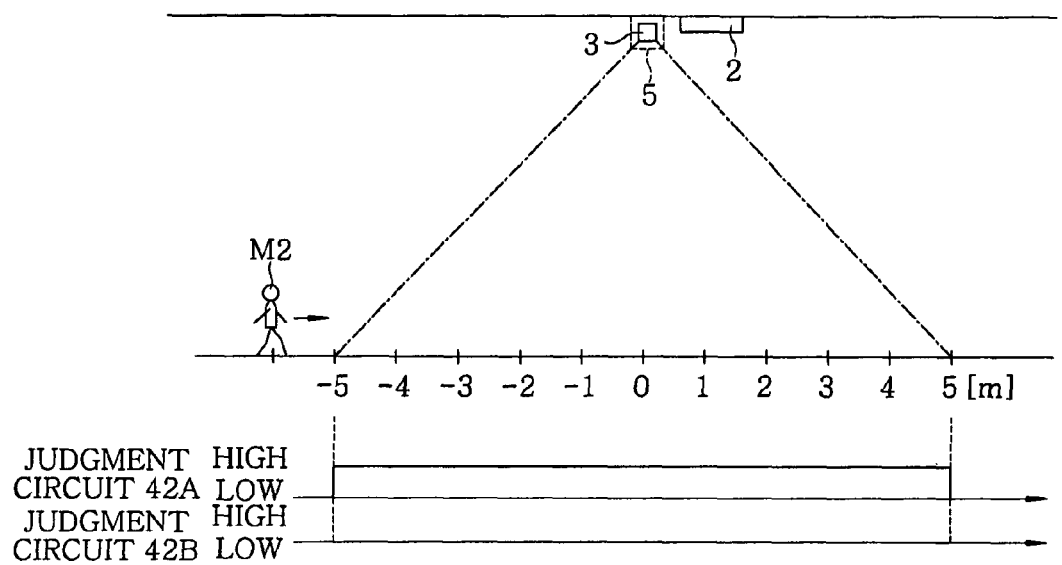
FIGS. 5A and 5B respectively show the judgment results made by judgment circuits when a human being comes into the detection area of the active sensor at a low travel velocity and when a motor vehicle comes into the detection area at a high travel velocity.
Figure 5B:
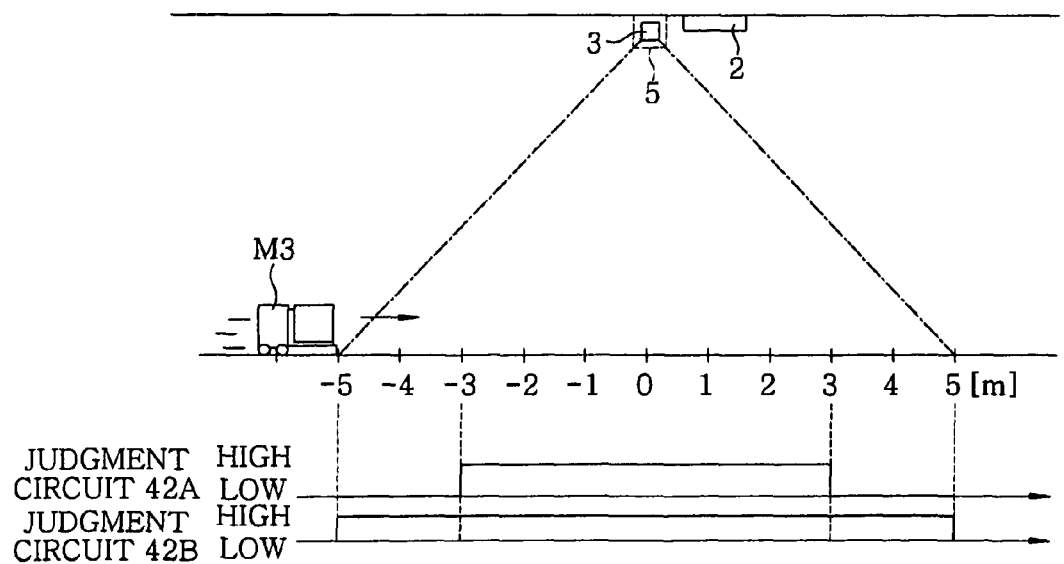

FIGS. 5A and 5B show the judgment results of made by the judgment circuits 42 when a human being M2 passes through the detection area (indicated by broken lines) of the sensor 3 at a low travel velocity and when a motor vehicle M3 passes through the detection area at a high travel velocity, wherein values of parameters used herein are the same as those substituted into Eq. (4).

As shown in FIG. 5A, the Doppler frequency $f_d$ of the human being M2 is equal to or smaller than about 165 Hz when the human being M2 passes through the detection area of the sensor 3 at a low travel velocity. Therefore, the judgment circuit 42A corresponding to that frequency band detects the presence of the human being M2, as a result of which the output value of the judgment circuit 42A becomes high. On the other hand, though the judgment circuit 42B is also capable of detecting the signal within the frequency band of about 0 to 200 Hz, the amplifier circuit 41B arranged ahead of the judgment circuit 42B has a broad pass band. Therefore, the signal amplified by the amplifier circuit 41B normally contains a great deal of noise. In addition, the level of the wave reflected by the human being M2 is normally low and, therefore, the detection signal of the sensor 3 is weak. For that reason, the detected signal is buried in the noise and, consequently, the judgment circuit 42B is incapable of detecting the human being M2, as a result of which the output value of the judgment circuit 42B becomes low.

In contrast, the Doppler frequency $f_d$ of the motor vehicle M3 is changed in the range from about 0 to 465 Hz when the motor vehicle M3 passes through the detection area of the sensor 3 at a high travel velocity as shown in FIG. 5B. Therefore, the judgment circuit 42B corresponding to that frequency band detects the presence of the motor vehicle M3, as a result of which the output value of the judgment circuit 42B becomes high. The Doppler frequency $f_d$ becomes higher as the moving object M1 is farther from the sensor 3 but becomes lower as the moving object M1 is closer to the sensor 3. Therefore, the Doppler frequency $f_d$ is changed from about 465 Hz to 0 Hz and then to 465 Hz as the motor vehicle M3 comes into, passes through, and comes out of the detection area of the sensor 3. If the motor vehicle M3 comes closer to the sensor 3 and thus the Doppler frequency $f_d$ becomes equal to or smaller than 200 Hz, the judgment circuit 42A also detects the motor vehicle M3 during that period of time, as a result of which the output value of the judgment circuit 42A is changed from low to high.

Figure 6:
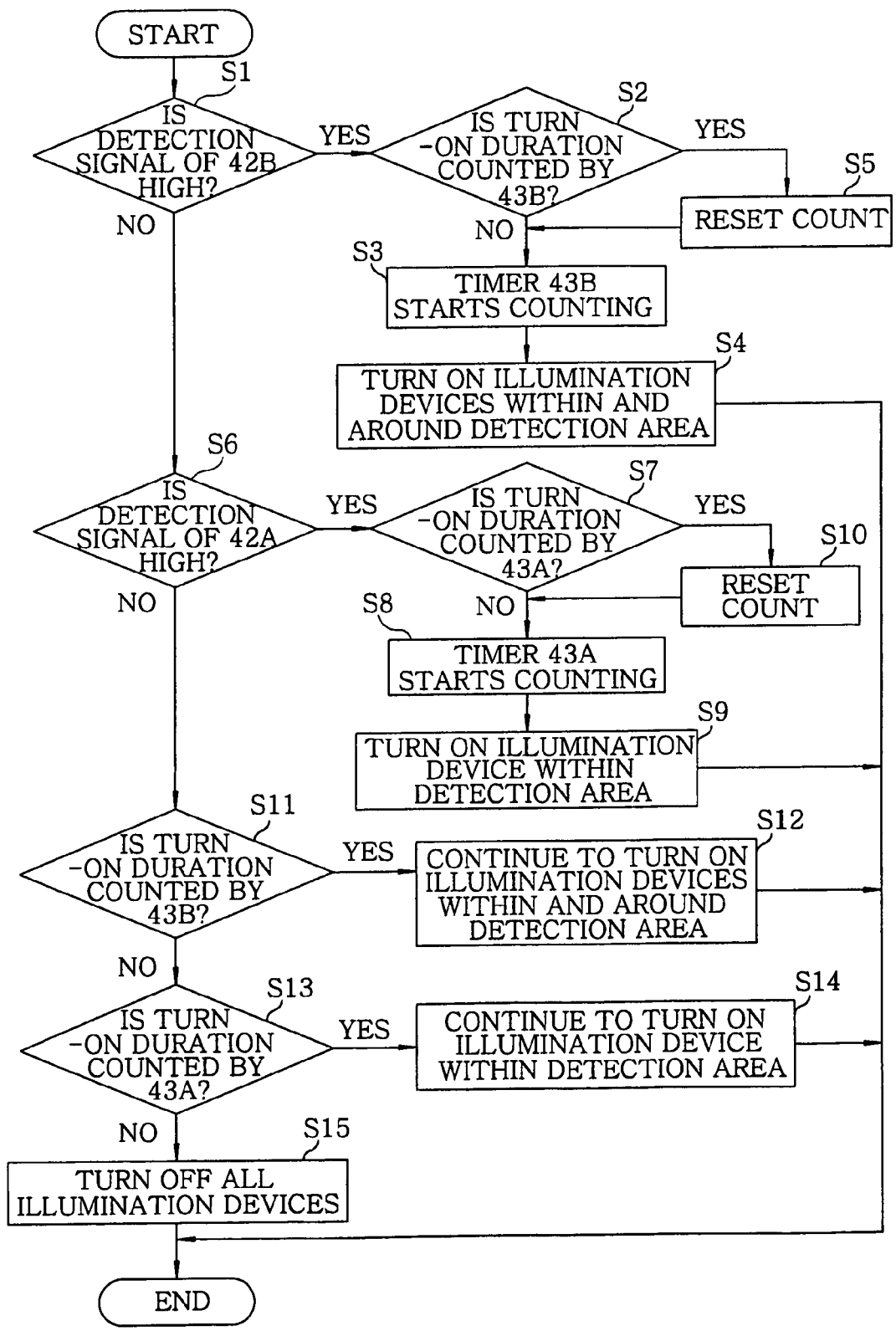
FIG. 6 is a flow chart illustrating the illumination device turn-on operation performed by a control circuit of the illumination system.

FIG. 6 illustrates the turn-on control process of illumination devices 2 performed by the control circuit 44 of the control device 4 of the each sensor block 5. Description of the turn-on control process will be made with reference to the sensor block 5A. The operations of the other sensor blocks are the same as the operation of the sensor block 5A.

If the sensor 3A detects the moving object M1 and the detection signal generated by the judgment circuit 42B is changed from low to high (Yes in step S1) and if the turn-on duration is not being counted by the timer 43B (No in step S2), the timer 43B starts to count the turn-on duration (step S3). Then, the illumination device 2A within its detection area 8A (see FIG. 7B) of the sensor 3A and one or more illumination devices 2 around the detection area 8A (e.g., one or more illumination devices 2 within one or more detection areas neighboring to the detection area 8A are turned on (step S4). If the turn-on duration is being counted by the timer 43B (Yes in step S2), the count is reset (step S5). The timer 43B starts counting the turn-on duration (steps S3) and the illumination devices 2 within and around the detection area 8A remain to be turned on in step S4.

If the detection signal generated by the judgment circuit 42B is not changed from low to high when the sensor 3A has detected the moving object M1 (No in step S1) and if the detection signal generated by the judgment circuit 42A is changed from low to high (Yes in step S6), it is checked that whether the turn-on duration is being counted by the timer 43A (step S7). If the answer in step S7 is no, the timer 43A starts to count the turn-on duration (step S8). Then, the illumination device 2A arranged within the detection area 8A of the sensor 3A that has detected the moving object M1 is turned on (step S9).

If the answer in step S7 is yes, the count is reset (step S10). Then, the timer 43A starts counting the turn-on duration (step S8) and the illumination device 2A within the detection area 8A remains to be turned on in step S9.

If the detection signal generated by the judgment circuit 42A is not changed from low to high (No in step S6) and if the turn-on duration is being counted by the timer 43B (Yes in step S11), the illumination devices 2 arranged within and around the detection area 8A of the sensor 3A that has detected the moving object M1 continue to be turned on (step S12).

If the turn-on duration is not being counted by the timer 43B (No in step S11) and if the turn-on duration is being counted by the timer 43A (Yes in step S13), the illumination device 2A arranged within the detection area 8A of the sensor 3A that has detected the moving object M1 continue to be turned on while the counting is being made (step S14). If the turn-on duration is not being counted by the timer 43A (No in step S13), all of the illumination devices 2 within and around the detection area 8A are turned off (step S15). It should be noted that each of the timers 43A and 43B continues counting the turn-on duration until, e.g., the remaining turn-on duration becomes zero. It should be also noted that only one of two neighboring sensor blocks detects a moving object, all the illumination devices 2 for the two sensor blocks 5 are controlled by the sensor block 5 that detects the moving object.

Figure 7A:
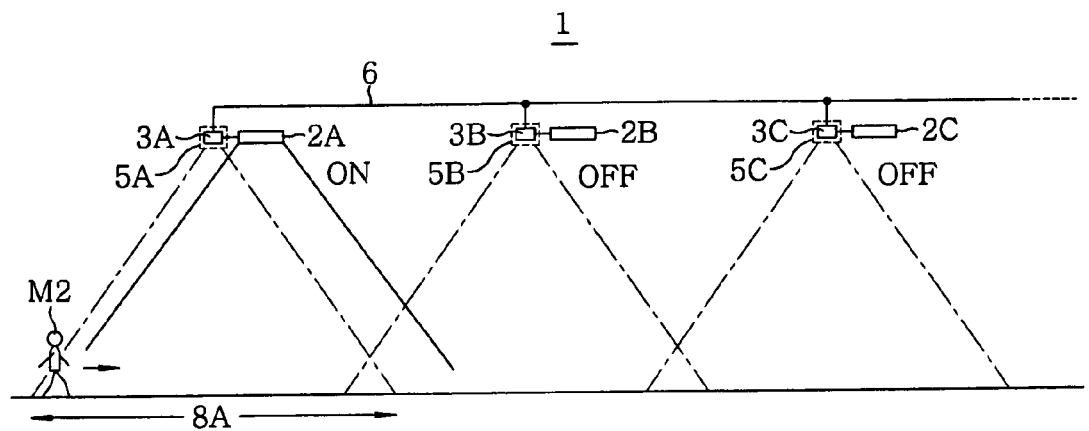
FIGS. 7A and 7B respectively show the illumination areas available when a human being comes into the detection area of the active sensor at a low travel velocity and when a motor vehicle comes into the detection area at a high travel velocity.
Figure 7B:
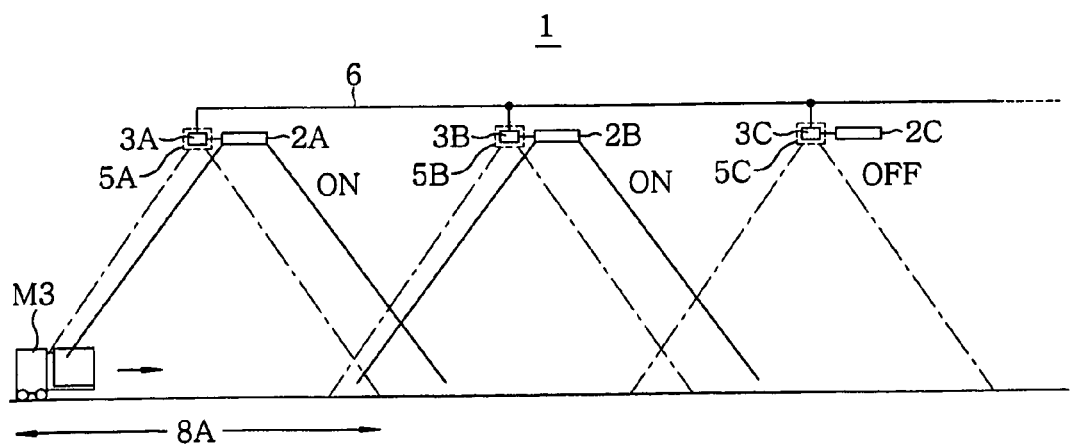
Figure 8A:
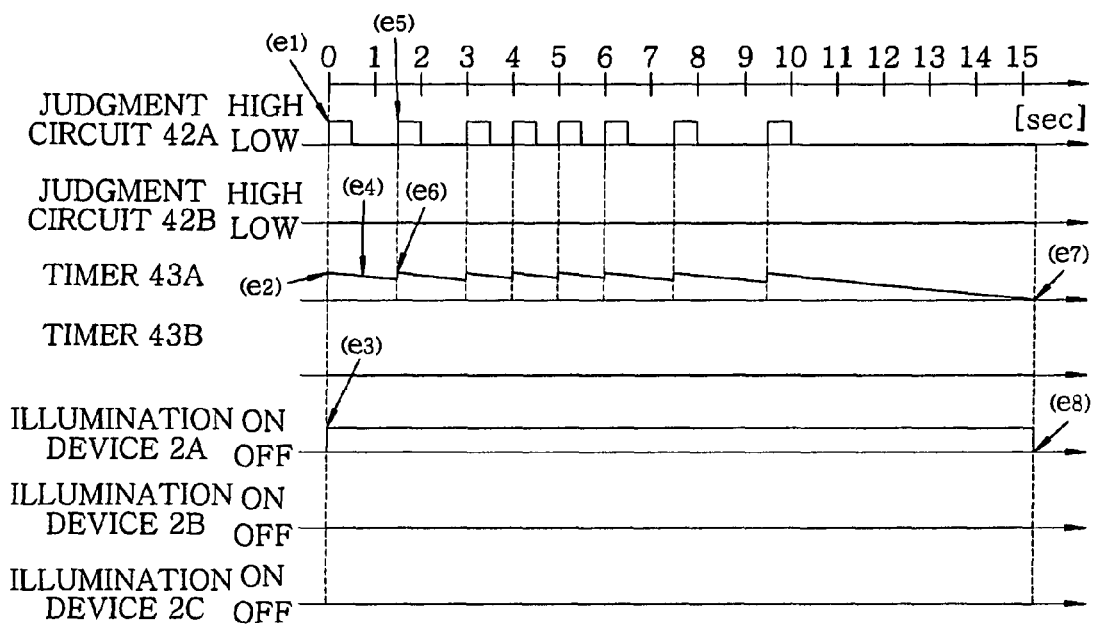
FIGS. 8A and 8B respectively show system time charts available when a human being comes into the detection area of the active sensor at a low travel velocity and when a motor vehicle comes into the detection area at a high travel velocity.
Figure 8B:
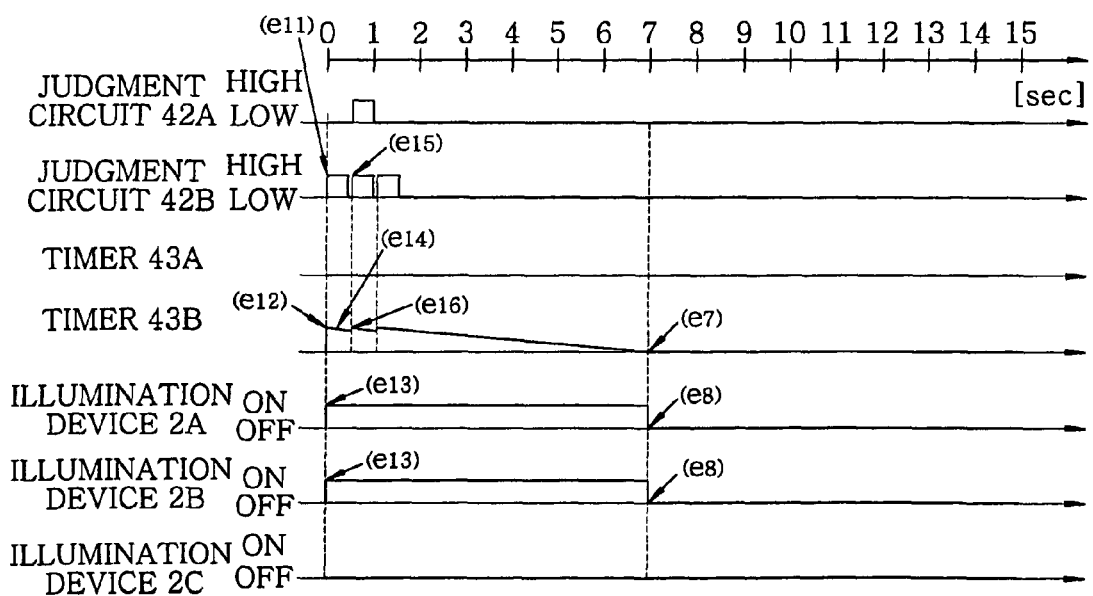

FIGS. 7A and 7B show examples of illumination performed when the moving objects M1 having different travel velocities come into the detection area of the sensor 3A. FIGS. 8A and 8B illustrate time charts available in the respective illumination examples shown in FIGS. 7A and 7B. If a human being M2 as the moving object comes into the detection area (indicated by broken lines) of the sensor 3A at a low velocity as shown in FIG. 7A, the output value of the judgment circuit 42A becomes high (event 1 (hereinafter, event "X" will be referred to as e"X" for simplicity)) and the timer 43A starts to count the turn-on duration (e2) as illustrated in FIG. 8A. Then, the illumination device 2A arranged within the detection area of the sensor 3A is turned on (e3) (see FIG. 7A also). The illumination device 2A continues to be turned on while the turn-on duration is counted by the timer 43A. If the output value of the judgment circuit 42A is changed from low to high (e5) during the counting operation (e4) performed by the timer 43A, the timer 43A resets its count (e6). Once the timer 43A terminates its counting operation (e7), the illumination device 2A is turned off (e8).

If a motor vehicle M3 as the moving object M1 comes into the detection area of the sensor 3A at a high velocity as shown in FIG. 7B, the output value of the judgment circuit 42B becomes high (e11) and the timer 43B starts to count the turn-on duration (e12) as illustrated in FIG. 8B. Then, the illumination device 2A arranged within the detection area of the sensor 3A and the illumination device 2B arranged around the detection area are turned on (e13) (see FIG. 7B also). The illumination devices 2A and 2B continue to be turned on while the turn-on duration is counted by the timer 43B. If the output value of the judgment circuit 42B is changed from low to high (e15) during the counting operation (e14) performed by the timer 43B, the timer 43B resets its count (e16). Once the timer 43B terminates its counting operation (e17), the illumination devices 2A and 2B are turned off (e18).

In the present embodiment, the detection signal from the sensor 3 is divided into two frequency bands. The presence of the moving object M1 traveling at the travel velocity corresponding to the respective frequency bands is judged based on the signal components of the respective frequency bands. Therefore, it is possible to detect the travel velocity of the moving object M1. This makes it possible to perform turn-on control of the illumination devices 2 based on the travel velocity of the moving object M1.

Only the illumination device 2 arranged within the detection area covered by the sensor 3 detecting the moving object M1 is turned on if the travel velocity of the moving object M1 is low. This assists in saving energy. In case where the travel velocity of the moving object M1 is high, it is possible to illuminate the surrounding area of the detection area from which the moving object M1 is detected before the moving object M1 passes through the detection area and reaches the surrounding area. Therefore, the moving object M1 travelling at a high travel velocity can be illuminated with no interruption of illumination regardless of its position. This can drive the moving object M1, i.e., the motor vehicle M3 without being stressed due to the interruption of illumination.

In addition, there are provided the amplifier circuit 41B having a broad pass band and the amplifier circuit 41A having a narrow pass band. This enables the judgment circuit 42B to judge the presence of the moving object M1 traveling at a high velocity and having a high Doppler frequency. The amplifier circuit 41B has a relatively high noise level because it has a broad pass band. Therefore, if the moving object M1 is a human being traveling at a low velocity and having a relatively low reflectance, the judgment circuit 42B is incapable of judging the presence of the moving object M1 with high accuracy. However, the presence of such moving object M1 can be accurately judged by the amplifier circuit 41A and the judgment circuit 42A, which have the narrow pass band and a reduced relatively low noise level. This enables the illumination system 1 to accurately detect the moving objects M1 having velocities of wide range regardless of the travel velocity thereof.

Modified Example of the First Embodiment

Figure 9:
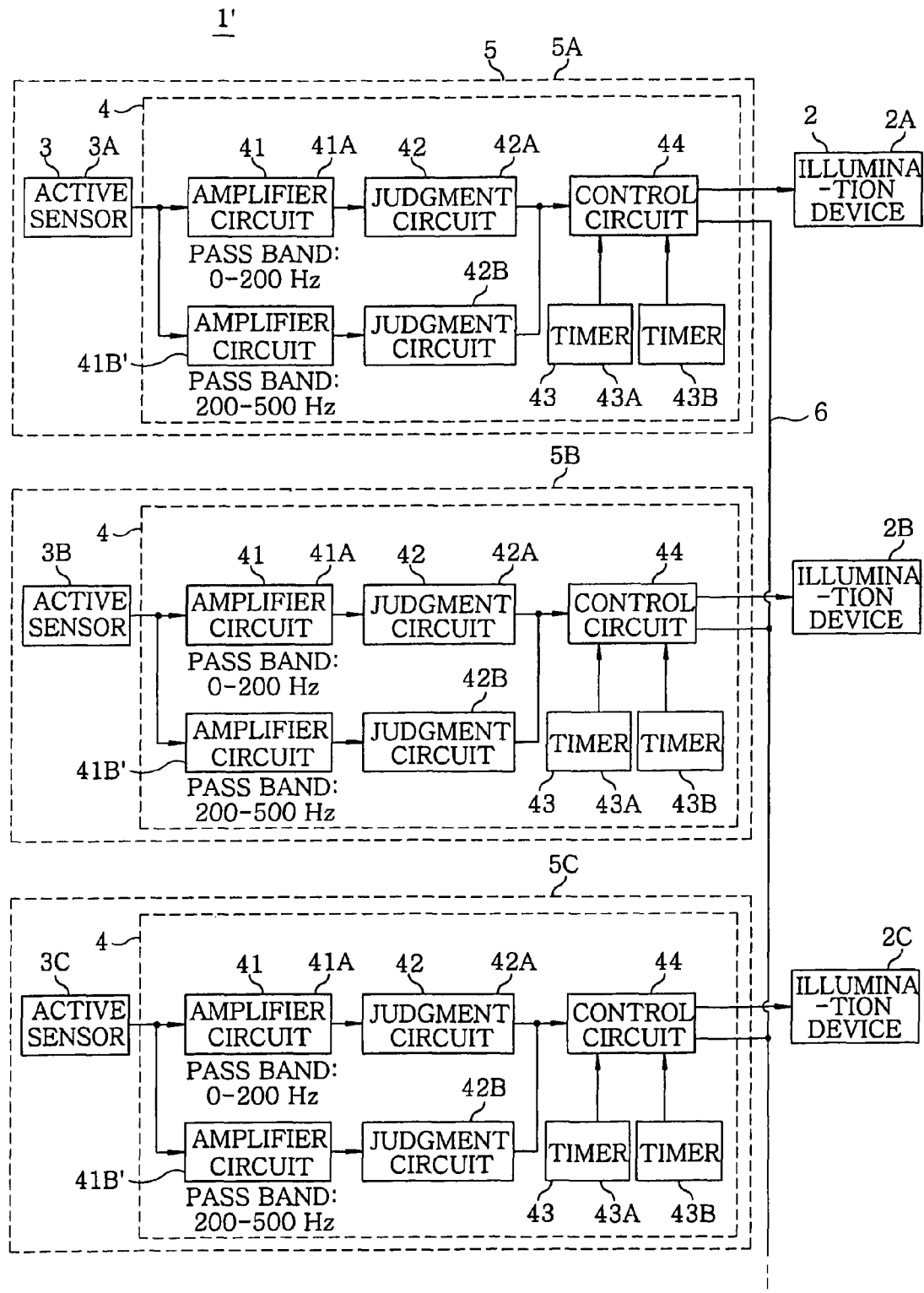
FIG. 9 shows a block diagram showing an illumination system in accordance with a modified example of the first embodiment.

FIG. 9 shows the electrical configuration of an illumination system 1' in accordance with a modified example of the first embodiment. In this modified example, the pass band of the amplifier circuit 41B' is set equal to about 200 to 500 Hz.

Figure 10:
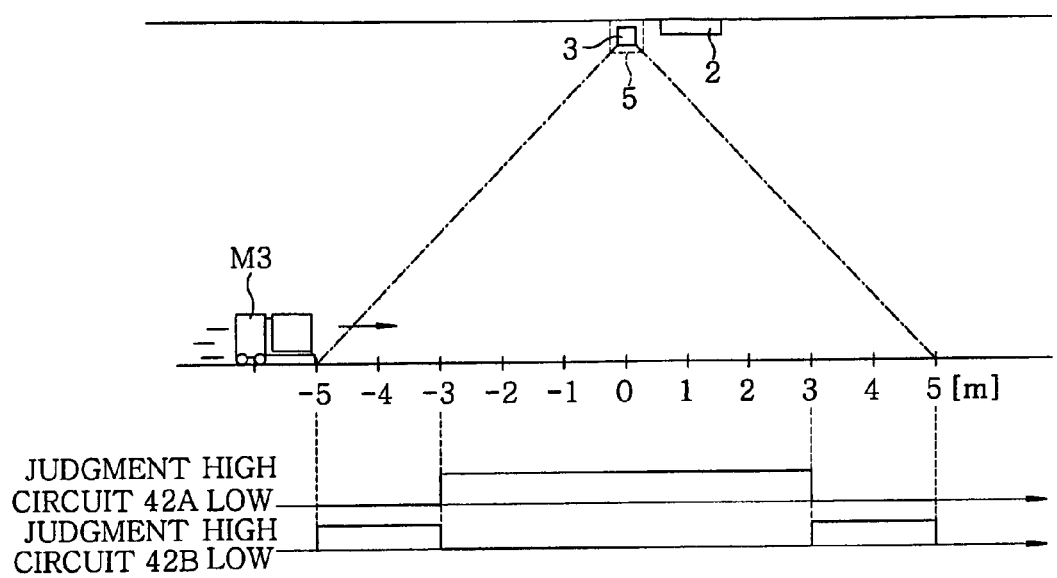
FIG. 10 shows the judgment results made by judgment circuits when a motor vehicle comes into the detection area of the active sensor of the modified illumination system at a high travel velocity.

FIG. 10 shows the judgment results of the judgment circuits 42 when a motor vehicle M3 passes through the detection area of the sensor 3 at a high travel velocity, wherein values of parameters used herein are the same as those substituted into Eq. (4).

The Doppler frequency $f_d$ of the motor vehicle M3 is changed in the range from about 0 to 465 Hz when the motor vehicle M3 passes through the detection area of the sensor 3. The Doppler frequency $f_d$ becomes higher as the moving object M1 is farther from the sensor 3 but becomes lower as the moving object M1 is closer to the sensor 3. Therefore, the Doppler frequency $f_d$ is changed from about 465 Hz to 0 Hz and then to 465 Hz as the motor vehicle M3 comes into, passes through, and comes out of the detection area of the sensor 3. When the Doppler frequency $f_d$ is changed from about 465 Hz to about 200 Hz and vice versa, the judgment circuit 42B detects the presence of the motor vehicle M3, as a result of which the output value of the judgment circuit 42B becomes high. If the motor vehicle M3 comes closer to the sensor 3 and thus the Doppler frequency $f_d$ becomes equal to or smaller than 200 Hz, the judgment circuit 42B is incapable of detecting the motor vehicle M3 during that period of time, as a result of which the output value of the judgment circuit 42B becomes low. Instead, the judgment circuit 42A detects the motor vehicle M3, as a result of which the output value of the judgment circuit 42A is high.

Figure 11:
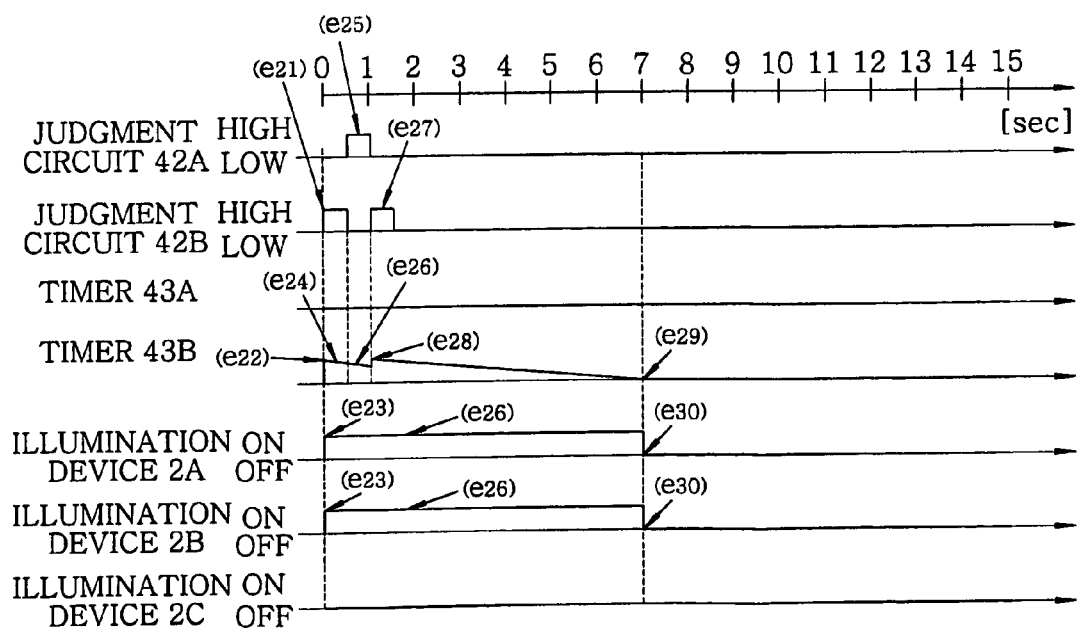
FIG. 11 is a system time chart available when a motor vehicle comes into the detection area at a high travel velocity.

FIG. 11 illustrates a time chart of the illumination system 1' available when the motor vehicle M3 comes into the detection area of the sensor 3A at a high velocity. In this case, the output value of the judgment circuit 42B becomes high (e21) and the timer 43B starts to count the turn-on duration (e22). Then, the illumination device 2A arranged within the detection area of the sensor 3A and the illumination device 2B arranged around the detection area are turned on (e23). The illumination devices 2A and 2B continue to be turned on while the turn-on duration is counted by the timer 43B. Even if the output value of the judgment circuit 42A is changed from low to high (e25) while the timer 43B performs its counting operation (e24), it is not judged that the moving object M1 with a low velocity has come into the detection area of the sensor 3A and the change in the output value of the judgment circuit 42A is neglected. The counting operation continues to be performed and the illumination devices 2A and 2B are kept turned on (e26). In contrast, if the output value of the judgment circuit 42B is changed from low to high (e27), the timer 43B resets its count (e28). Once the timer 43B terminates its counting operation (e29), the illumination devices 2A and 2B are turned off (e30).

Second Embodiment

In an illumination system in accordance with a second embodiment of the present invention, the turn-on duration of the illumination devices varies with the velocity of a moving object. Since the component parts of the present embodiment are the same as those of the first embodiment, description will be made with reference to FIG. 2. The control circuit 44 of the control device 4 employed in the present embodiment determines the travel velocity of the moving object according to the judgment results of the judgment circuits 42. The turn-on duration of the illumination devices 2 is adjusted based on the results thus determined. Examples of the relationship between the determination criteria and the turn-on duration are shown in Table 2.

TABLE 2

| Output Value of Judgment Circuit 42A | Output Value of Judgment Circuit 42B | Detection Result and Travel velocity of Object | Turn-on Duration |
|---|---|---|---|
| low | low | not detected | turned off |
| high | low | detected    slow | turned on for 30 seconds |
| low | high | detected    fast | turned on for 5 seconds |
| high | high | detected    fast | turned on for 5 seconds |

In the present embodiment, the turn-on duration of the illumination devices 2 are adjusted based on the travel velocity of the moving object M1. More specifically, as shown in Table 2, the turn-on duration becomes shorter as the travel velocity of the moving object M1 becomes higher, whereas the turn-on duration becomes longer as the travel velocity of the moving object M1 becomes lower. Therefore, it is possible to control the turn-on duration in harmony with the time for the moving object M1 to pass through the area illuminated by the illumination devices 2. Further, this assists in saving energy.

The present invention may not be limited to the above embodiments but may be variously modified depending on the purpose of use. For example, the sensors 3 may or may not be attached to the illumination devices 2. Furthermore, the number of the frequency bands of the amplifier circuits 41 for the signal components extracted from the detection signal of the sensor 3 is not limited to two but may be three or more. Accordingly, the numbers of the amplifier circuits 41, the judgment circuits 42 and the timers 43 may be also three or more to coincide with the number of the frequency bands. Further, each amplifier circuit 41 of the previously described embodiments of the invention functions as a filter unit and an amplifier unit, but the filter unit and the amplifier unit may be provided separately.

Further, the sensor blocks 5 and the detection areas are one-dimensionally arranged in the above embodiments, but they may be two-dimensionally arranged, e.g., in a matrix shape or a honeycomb pattern such that a detection area from which the moving object is detected may be directly in touch with one or more neighboring detection areas. In such case, when a fast moving object enters a detection area, illumination devices corresponding to maximum 8 neighboring detection areas (in case of matrix arrangement) and 6 neighboring detection areas (in case of honeycomb arrangement) are also turned on. Further, two or more illumination devices 2 may be provided to illuminate each detection area.

In addition, all of the illumination devices 2 may be turned on when the moving object M1 comes into the detection area of any one of the sensors 3 at a high velocity.

While the invention has been shown and described with respect to the embodiments, it will be understood by those skilled in the art that various changes and modification may be made without departing from the scope of the invention as defined in the following claims.

What is claimed is:

1. An illumination system comprising:
a plurality of illumination devices; and
a number of sensor blocks, each of the sensor blocks including:
an active sensor for detecting a moving object traveling within a detection area thereof;
a first and a second amplifier circuit for dividing a detection signal transmitted from the active sensor into a first and a second frequency band and for amplifying signal components of the frequency bands;
a first and a second judgment unit provided in a one-to-one relationship with the amplifier circuits for, based on the amplified signal components of the frequency bands provided from the amplifier circuits, judging whether the moving object is travelling at a travel velocity corresponding to any one of the frequency bands;
a first and a second timer provided in one-to-one relationship with the judgment units for counting turn-on durations of the illumination devices based on results of the judgment units; and
a control unit for performing a turn-on control on at least one of the illumination devices based on judgment results made by the judgment units and results of time count of the timers,
wherein the frequency band of the second amplifier circuit covers the entire frequency band of the first amplifier circuit.

2. The illumination system of claim 1, wherein the control unit determines whether the travel velocity of the moving object is low or high based on the judgment results made by the judgment units and turns on one or more illumination devices arranged within the detection area of the active sensor if the travel velocity of the moving object is low and turns on illumination devices arranged within and around the detection area if the travel velocity of the moving object is high.

3. The illumination system of claim 1, wherein the control unit determines the travel velocity of the moving object based on the judgment results made by the judgment units and adjusts a turn-on duration of said at least one of the illumination devices based on travel velocity thus determined.

4. The illumination system of claim 2, wherein the control unit determines the travel velocity of the moving object based on the judgment results made by the judgment units and adjusts a turn-on duration of said at least one of the illumination devices based on travel velocity thus determined.

* * * * *